(12) United States Patent
Yamamoto et al.

(10) Patent No.: US 7,181,239 B2
(45) Date of Patent: Feb. 20, 2007

(54) PORTABLE TELEPHONE APPARATUS WITH CAMERA

(75) Inventors: Shinya Yamamoto, Higashiyamato (JP); Ken Ofuchi, Kodaira (JP); Masao Mimura, Fussa (JP)

(73) Assignee: Hitachi, Ltd., Tokyo (JP)

( * ) Notice: Subject to any disclaimer, the term of this patent is extended or adjusted under 35 U.S.C. 154(b) by 207 days.

(21) Appl. No.: 10/898,355

(22) Filed: Jul. 26, 2004

(65) Prior Publication Data

US 2005/0255881 A1 Nov. 17, 2005

(30) Foreign Application Priority Data

May 17, 2004 (JP) ............................. 2004-145993

(51) Int. Cl.
*H04M 1/00* (2006.01)
(52) U.S. Cl. ............................... 455/556.1; 455/575.4; 455/903; 455/186.1; 348/376
(58) Field of Classification Search ............. 455/556.1, 455/550.1, 566, 575.1, 575.3, 575.4, 90.1, 455/90.2, 90.3, 575.2, 161.1, 161.2, 179.1, 455/185.1, 186.1; 348/14.02, 14.03, 373, 348/374, 376
See application file for complete search history.

(56) References Cited

U.S. PATENT DOCUMENTS

2004/0116168 A1* 6/2004 Usui ....................... 455/575.3
2004/0192400 A1* 9/2004 Chwa ........................ 455/566
2004/0204144 A1* 10/2004 Lim .......................... 455/566
2004/0259590 A1* 12/2004 Middleton ............... 455/556.1
2005/0020239 A1* 1/2005 Kang et al. ................. 455/403

FOREIGN PATENT DOCUMENTS

| JP | A-6-301448 | 10/1994 |
|----|------------|---------|
| JP | 07-303079  | 11/1995 |

* cited by examiner

*Primary Examiner*—Edward F. Urban
*Assistant Examiner*—Nhan T. Le
(74) *Attorney, Agent, or Firm*—Antonelli, Terry, Stout and Kraus, LLP.

(57) ABSTRACT

A portable telephone apparatus with camera is disclosed, in which the interference between the harmonic component generated from the camera and the receiving frequency band for radio communication can be reduced. The apparatus comprises a radio communication circuit for conducting the radio communication with an external device, a clock signal generating circuit capable of controlling the output clock signal frequency, a camera operated with the output clock signal as an operating clock signal and a control circuit. The control circuit, based on the receiving frequency band information acquired from the radio communication circuit, controls the clock signal of the clock signal generating circuit in such a manner that the harmonic components of the clock signal frequency are not superposed on the receiving frequency band for conducting the radio communication.

12 Claims, 6 Drawing Sheets

FIG.5

| RECEIVING CH | RECEIVING FREQUENCY BAND | FREQUENCY DIVIDING RATIO SETTING | OPERATING CLOCK | 27-FOLD HARMONICS |
|---|---|---|---|---|
| A | 837.4~838.6 MHz | Na = 800 | 32 MHz | 864 MHz |
| B | 841.4~842.6 MHz | Nb = 800 | 32 MHz | 864 MHz |
| C | 844.9~846.1 MHz | Nc = 800 | 32 MHz | 864 MHz |
| D | 862.9~864.1 MHz | Nd = 801 | 32.04 MHz | 865.08 MHz |
| E | 865.4~866.6 MHz | Ne = 800 | 32 MHz | 864 MHz |
| F | 868.4~869.6 MHz | Nf = 800 | 32 MHz | 864 MHz |

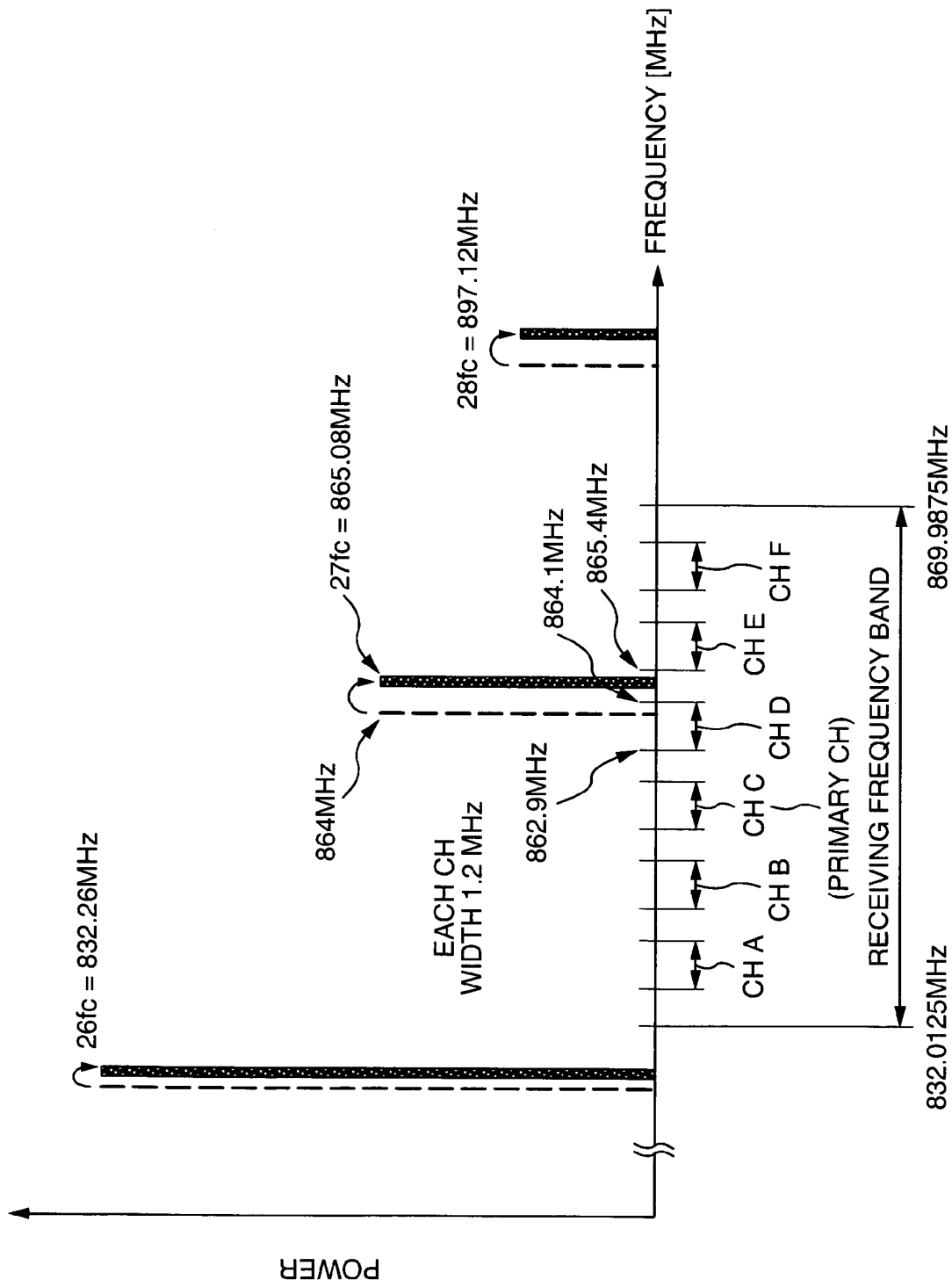

PORTABLE TELEPHONE APPARATUS WITH CAMERA

INCORPORATION BY REFERENCE

The present application claims priority from Japanese application JP2004-145993 filed on May 17, 2004, the content of which is hereby incorporated by reference into this application.

BACKGROUND OF THE INVENTION

The present invention relates to a portable telephone apparatus with camera, or in particular to a technique for the camera operating clock signal against the receiving frequency band in which the radio communication is conducted by the portable telephone apparatus.

The portable telephone apparatus includes a control circuit having a CPU (central processing unit) for controlling the whole system in addition to a radio circuit for conducting the radio communication. In recent years, the processing speed of the control CPU mounted on the portable telephone apparatus has been increased in keeping with the improved functions for games and mail. This has also increased the clock signal frequency for operation of the control CPU.

The clock signal input to the control CPU and the digital signal output in synchronism with the clock signal assume a rectangular waveform containing harmonic components as large as twice, thrice, quadruple, and so on of the output frequency. Each harmonic component has a characteristic of a smaller radiation energy, the larger the character n indicating the number of multiples of the harmonic component. The harmonic component has an effect as a radiation noise on the radio communication of the portable telephone apparatus.

With the recent trend toward an ever smaller size of the portable telephone apparatus, the control circuit such as the control CPU and the radio communication circuit having the function inherent to the portable telephone apparatus are arranged on a substrate integrated with or in proximity to each other. As a result, the radio communication circuit has come to be affected with a greater ease by the radiation noises of the harmonic components of the control CPU clock signal. In the case where a harmonic component of the clock signal of the control CPU coincides with the radio communication frequency band, the receiving sensitivity would be deteriorated extremely or the radio communication would otherwise be adversely affected.

The frequency used for the radio communication of the portable telephone apparatus, on the other hand, is configured of a plurality of frequency bands called channels. In accordance with the position and the radio communication condition of the portable telephone apparatus, the radio communication is carried out by switching the channel used from time to time in response to instructions from the radio base station. In order to prevent the radiation noise of the harmonic components from affecting the radio communication, therefore, it is necessary to design the apparatus in such a way that the channels used are not affected by the harmonic components.

In the case of the portable telephone apparatus using ARIB STD-T53, Band Class (JTACS Band) for the CDMA (Code Division Multiple Access) scheme, for example, the receiving frequency band is 832.0125 MHz to 869.9875 MHz. Also, the portable telephone apparatus uses the control CPU clock signal of about 20 MHz in frequency. In this case, the frequency 42 times as high as the harmonic component of 20 MHz is 840 MHz and the frequency 43 times as high as the harmonic component is 860 MHz, both of which cause an interference by being superposed on the receiving frequency band.

A conventional technique providing a protective measure against the problem of the interference caused by the harmonic components of the clock signal frequency described above includes a method in which the noise source is covered with a metal case and shielded electrically.

This technique is employed for a portable electronic device (TV or computer) having a liquid display device and a circuit board built therein, in which a molded member with a conductive plating is arranged between the liquid crystal display device and the circuit board as a noise shielding member. In this way, the radiation noises of harmonic components generated from the circuit board are reduced (JP-A-6-301448).

In another conventional technique, the harmonic components of the control CPU clock signal are prevented from interfering with the radio communication channels and thus the noises in the radio communication are reduced by changing the operating clock signal frequency of the devices in accordance with the frequency band of the radio communication channels.

This technique is used with a portable telephone apparatus for conducting the radio communication with a plurality of communication channels, comprising a memory unit, a clock signal generating means and a control unit operated by the clock signal, wherein the frequency of the clock signal is regulated by a setting for changing the clock frequency not to interfere with the communication channels stored in advance in the memory unit based on the communication channel information. In this way, the interference is eliminated by preventing the harmonic components of the operating clock signal from being superposed on the frequency band of the communication channels (JP-A-7-303079).

In recent years, the portable telephone apparatus market has seen the increased sales of the portable telephone apparatuses with camera. The portable telephone apparatus with camera has gained the popularity due to its ability to pick up an image at any desired place and send it immediately to a receiver by electronic mail.

On the other hand, to meet the strong demand for a high pixel density, portable telephone apparatuses with camera having a pixel density as high as 1M or 2M pixels have recently been placed on the market.

In addition, the user demands a smooth image in monitoring and a smooth dynamic image that has been picked up. For a smooth image to be obtained, the number of image frames output from the camera within a predetermined time length (frame rate) is required to be increased.

The increased pixel density and the increased frame rate have led to an increased data rate of the image output from the camera and a higher rate of the camera operating clock signal. Specifically, the camera operating clock is set to a higher frequency than the clock signal frequency of the control circuit in some cameras placed on the market.

Many image pickup devices of the camera in the portable telephone apparatus now employ the CCD (charge coupled device) for its high sensitivity, high S/N and the ease with which to increase the pixel density.

The CCD is a charge transfer device capable of moving the charge as a mass of signals sequentially at the rate synchronized with the operating clock signal pulses derived from an external source. The CCD requires a voltage of about +15 V or −7.5 V at the time of charge transfer, and vertical transfer pulses or signal read pulses of about +15 V, −7.5 V and 22.5 V in potential difference for driving the CCD camera are generated in synchronism with the operating clock signal.

On the other hand, the voltage used in the control circuit of the portable telephone apparatus is about 3 V or 1.8 V, and therefore the radiation energy of the harmonic components of the camera is approximately five times higher than that of the control circuit. With the increase in the operating clock signal rate of the camera of the portable telephone apparatus, therefore, the problem of interference by the radiation noises of the harmonic components becomes more conspicuous. It is of urgent necessity to take an appropriate measure against this problem.

The manner in which the radiation noises of the harmonic components interfere with the receiving channel is shown in FIG. 3. The operating clock signal frequency of the camera is given as fc, which is accompanied by harmonic of 2fc, 3fc, and so forth. The explanation below assumes that the receiving band is 832.0125 MHz to 869.9875 MHz and fc=32 MHz. FIG. 3 indicates that the frequency of 864 MHz about 27 times as high as the camera operating frequency fc of 32 MHz interferes with the receiving band.

FIG. 4 is an enlarged view of the receiving band used in the conventional radio communication. This receiving band includes a plurality of receiving channels A to F each assumed to have a channel width of about 1.2 MHz by way of explanation.

The radio communication of the portable telephone apparatus is carried out using one of a plurality of channels (A to F) specified by a common carrier in compliance with an instruction from a radio base station in accordance with the radio communication conditions. In the case where the channel D is used in compliance with an instruction of the radio base station, for example, the channel D is superposed on the frequency of 864 MHz which is a harmonic 27 times as high as the camera operating frequency fc of 32 MHz, and the resultant interference of the radiation noise of the harmonic component poses the problem of a deteriorated receiving sensitivity.

The CCD camera, which has a module structure configured of a CCD sensor and a lens, requires a focal length and hence a predetermined height. The height of about 10 mm is required for the ¼-inch 1.3 M-pixel CCD sensor, for example.

In order to keep up with the trend toward a thinner body of the portable telephone apparatus, the CCD sensor is not mounted on but connected to the circuit board through a flexible circuit. In this case, the radiation noise of the harmonic components of the clock signal for driving the CCD camera is released from the flexible circuit and has a greater effect on the radio communication.

In the conventional electrical shielding method described in JP-A-6-301448, the modules and even the flexible circuit of the camera are required to be shielded and therefore a compact, lightweight shield case cannot be fabricated. Further, the cost is increased by an amount corresponding to the shield case. Thus, this conventional method is not suitable for the portable telephone apparatus.

The prior art described in JP-A-7-303079, on the other hand, in which the clock signal frequency of the control circuit such as a control CPU is selectively changed, fails to deal with the operating clock signal frequency of the camera. In the application to the portable telephone apparatus with camera, therefore, the problem is posed that the interference cannot be reduced against the radiation noise of the harmonic components generated from the camera having a large radiation energy.

SUMMARY OF THE INVENTION

The object of this invention is to provide a portable telephone apparatus with camera in which the interference between the harmonic components generated from the camera and the receiving frequency band for radio communication can be reduced.

In order to achieve this object, according to one aspect of this invention, there is provided a portable telephone apparatus with camera, comprising a radio communication circuit for conducting radio communication with an external device, a clock signal generating circuit capable of controlling the output clock signal frequency, a camera operated with the same clock signal as an operating clock signal and a control circuit, wherein the control circuit, based on the receiving frequency band information acquired from the radio communication circuit, controls the clock signal of the clock signal generating circuit in such a manner that the harmonic components of the clock signal frequency are not superposed on the receiving frequency band for the radio communication.

As a result, even in the case where the camera has a large radiation energy, the operating clock signal frequency of the camera can be determined in such a manner that the frequency of the harmonic components of the camera is not superposed on the receiving band. Thus, a compact, lightweight and inexpensive portable telephone apparatus with camera can be provided in which the interference with the receiving frequency band for conducting radio communication is reduced with a camera of high pixel density and high frame rate.

According to another aspect of the invention, the receiving frequency band information is the information on the channel at which the radio communication circuit conducts radio communication.

As a result, the control circuit controls the clock signal of the clock signal generating circuit in such a manner that the harmonic components of the clock signal frequency is not superposed on the channel for radio communication, based on the information on the channel for radio communication. Thus, the operating clock signal frequency of the camera is required to be changed by a lesser amount, thereby reducing the effect that the change in the operating clock signal frequency has on the image quality.

According to still another aspect of the invention, there is provided a portable telephone apparatus with camera further comprising a memory unit for storing a table containing a plurality of channels for radio communication and corresponding settings to determine the operating clock signal frequency, wherein the control circuit, based on the channel information from the radio communication circuit, determines a setting for determining the operating clock signal frequency from the table of the memory thereby to control the clock signal from the clock signal generating circuit.

Thus, the operating clock signal frequency of the camera can be changed sufficiently based on the setting of the table stored in advance, and therefore processing load of the control circuit is reduced for an improved versatility.

According to yet another aspect of the invention, there is provided a portable telephone apparatus, wherein the clock signal generating circuit includes a reference clock signal generating circuit and a frequency control circuit for outputting the operating clock signal for the camera based on the reference clock signal.

As a result, the operating clock signal frequency of the camera can be changed without changing the reference clock signal of the control circuit, and therefore the circuit operated on the reference clock signal is prevented from being affected.

This invention provides a portable telephone apparatus with camera in which the interference between the harmonic components generated from the camera and the receiving frequency band for radio communication can be reduced.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram showing a correspondence table for frequency control stored in the memory unit of the portable telephone apparatus according to an embodiment of the invention.

FIG. 6 is an enlarged view of the receiving band used in the radio communication according to an embodiment of the invention for explaining the effects of the embodiments of the invention.

DESCRIPTION OF THE INVENTION

Embodiments of the invention are explained in detail below with reference to the accompanying drawings.

Figure 1:
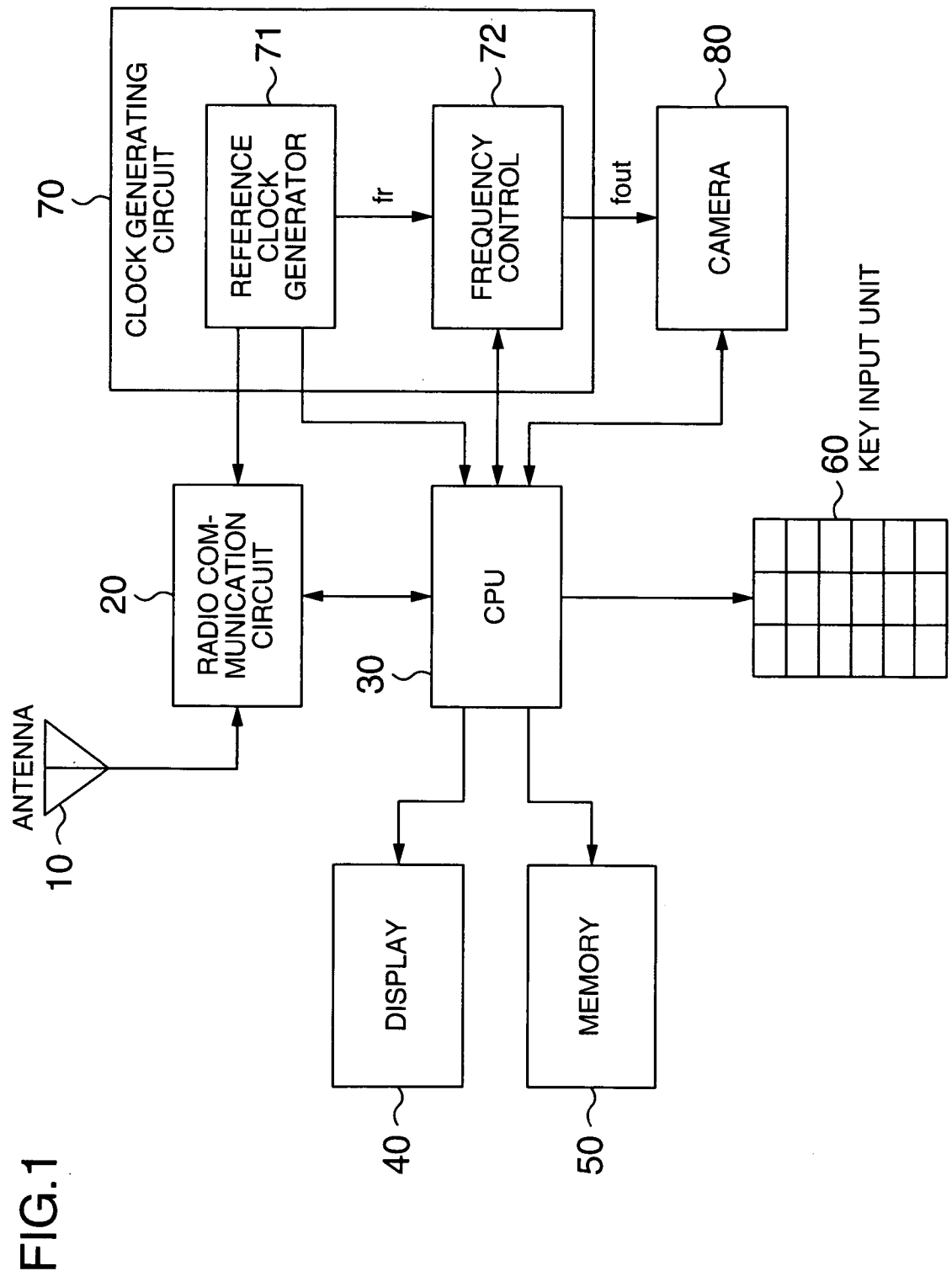
FIG. 1 a block diagram showing a portable telephone apparatus with camera according to an embodiment of the invention.

FIG. 1 is a block signal diagram showing a portable telephone apparatus with camera according to an embodiment of the invention. This portable telephone apparatus with camera comprises an antenna 10 and a radio communication circuit 20 connected to the antenna 10. The radio communication circuit 20 includes a codec circuit for a digital signal required for radio communication, a modem circuit, a communication radio wave transmission circuit and a receiving detection circuit, whereby the portable telephone apparatus according to this embodiment can conduct radio communication.

This portable telephone apparatus with camera comprises a CPU 30 for controlling the various functions as a portable telephone. The CPU 30 controls the radio communication circuit 20 and exchanges the transmission and receiving data with the radio communication circuit 20. As a result, the various operating information such as the receiving frequency and the receiving channel of the radio communication circuit 20 can be exchanged and controlled.

The CPU 30 is connected with a display unit 40, a memory unit 50, a key input unit 60 and a camera 90. The CPU 30 can executed not only the various functions of a portable telephone apparatus but also the functions of a camera of the portable telephone apparatus such as storage of still images and dynamic images output from the camera 80 in the memory unit 50 and displaying them on the display unit 40. Also, the user can apply various input signals to the portable telephone apparatus through the key input unit 60.

The CPU 30 is connected with the clock signal generating circuit 70. The clock signal generating circuit 70 is configured of a reference clock signal generating circuit unit 71 and a frequency control circuit 72.

The reference clock signal generating circuit unit 71 is configured of a crystal oscillator or a ceramic oscillator for generating a reference clock signal to activate the CPU 30. The CPU 30 is activated at the timing of this reference clock signal, outputs the transmission data to the radio communication circuit 20 and receives the information on the various operating conditions such as the receiving data and the receiving frequency from the radio communication circuit 20.

Also, the reference clock signal generating circuit 71 is connected with the radio communication circuit 20 and generates a reference clock signal of the transmission/receiving frequency used for radio communication.

The operating clock signal is supplied to the camera 80 through a frequency control circuit 72 connected to the CPU 30 and the reference clock signal generating circuit 71.

Figure 2:
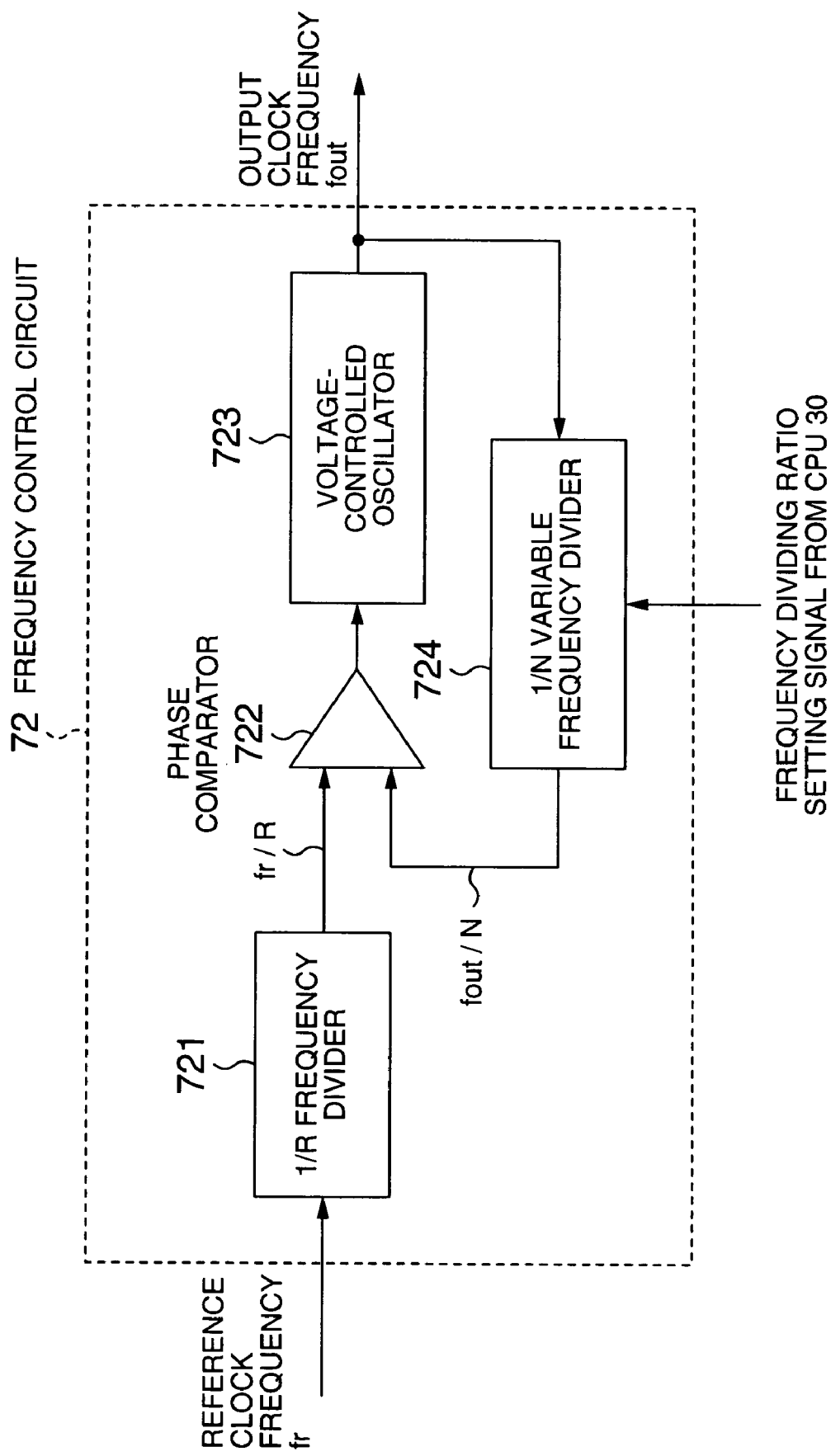
FIG. 2 is a diagram showing the internal configuration of a frequency control circuit unit shown in FIG. 1.
Figure 3:
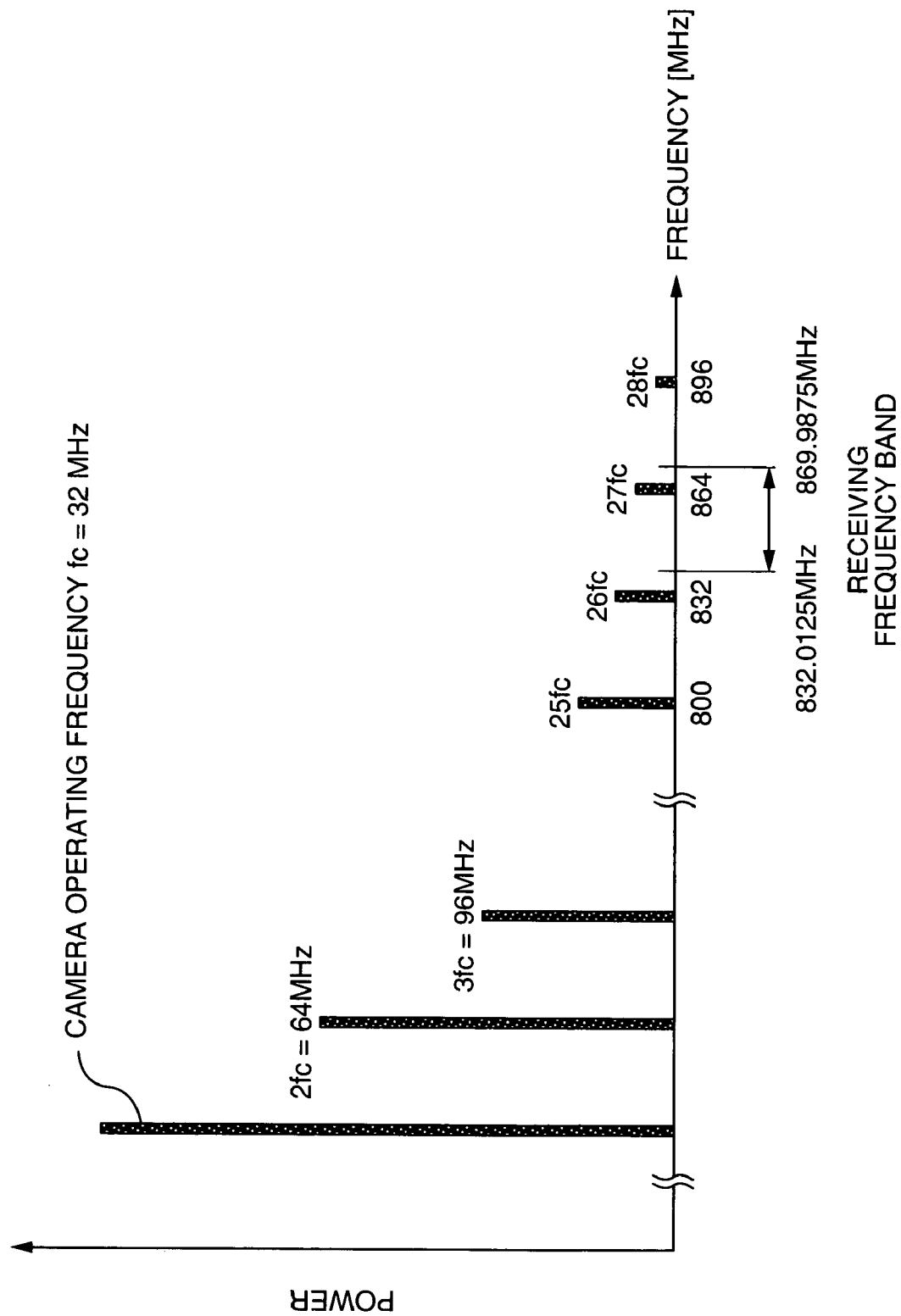
FIG. 3 is a diagram showing the manner in which the radiation noise of the harmonic components of the camera operating frequency interferes with the radio communication channel.
Figure 4:
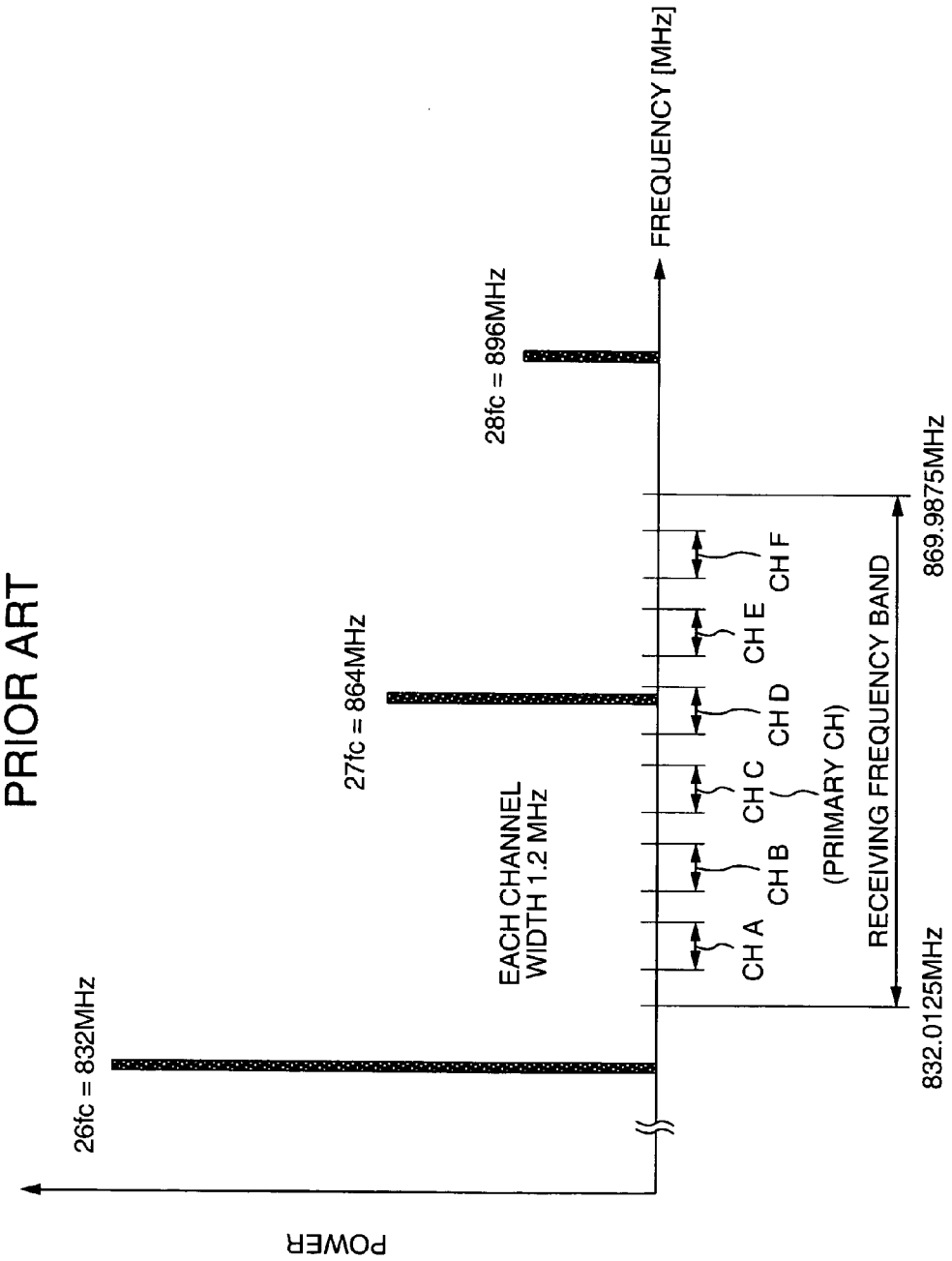
FIG. 4 is an enlarged view of the receiving band used in the conventional radio communication.

The configuration of the frequency control circuit 72 is explained with reference to FIG. 2. The frequency control circuit 72 is a PLL circuit configured of a 1/R frequency divider 721, a phase comparator (PD) 722, a voltage-controlled oscillation circuit (VCO) 723 and a 1/N variable frequency divider 724.

The reference clock signal frequency fr from the reference clock signal generating circuit 71 is input to the 1/R frequency divider 721 in which the input reference clock signal frequency fr is divided, output as fr/R and applied to one of the comparison signal input terminals of the phase comparator 722.

The output clock signal frequency fout of the frequency control circuit 72 is output from the voltage-controlled oscillation circuit 723 and input to the 1/N variable frequency divider 724. The 1/N variable frequency divider 724 is supplied with a dividing ratio setting signal from the CPU 30. The output clock signal frequency fout of the frequency control circuit 72 is divided into fout/N at the dividing ratio N set by the dividing ratio setting signal and input as a loop to the other comparison signal input terminal of the phase comparator 722.

The phase comparator 722 compares the frequency fr/R obtained by dividing the reference clock signal frequency fr with the frequency fout/N obtained by dividing the output clock signal by the frequency dividing ratio set by the CPU 30, and outputs the phase difference as a voltage.

The voltage-controlled oscillation circuit 723 determines and outputs the output frequency fout based on the output voltage of the phase comparator 722. This loop is so configured that fr/R and fout/N are controlled always to the same frequency. Specifically, the output clock signal frequency fout of the frequency control circuit 72 can be controlled by fr/R in accordance with the dividing ratio setting signal from the CPU 30, and therefore the output frequency can be set in a detailed manner by assuming a large value of R.

For example, the 1/R frequency divider 81 has the function of dividing the frequency into 256 stages of 8 bits and the 1/N frequency divider 84 into 1024 stages of 10 bits. In the case where the frequency of the reference clock signal is 10 MHz, for example, the reference clock signal frequency of 10 MHz is divided into 0.04 MHz by the 1/R frequency divider 721. Assuming that the dividing ratio setting of the 1/N frequency divider 724 is 800, the output clock signal frequency fout of 32 MHz is obtained. In similar fashion, the output clock signal frequency fout of 32.04 MHz is obtained when the dividing ratio is set to 801, and 32.08 MHz for the frequency dividing ratio of 802.

In this embodiment, the frequency control circuit 72 is configured of a PLL. As far as the frequency can be controlled, however, a voltage-controlled oscillator alone or a circuit for switching the outputs of a plurality of oscillators may be employed with equal effect.

Next, the process of controlling the operating clock signal frequency of the camera 80 of a portable telephone apparatus with camera according to an embodiment of the invention is explained.

First, the user switches on power by way of a power switch button arranged on the key input unit 60. The power thus switched on is detected by the CPU 30 through the key input unit 60, so that the portable telephone apparatus starts to operate. Once the portable telephone apparatus starts operation, the radio communication circuit 20 starts communication with a radio base station through a first channel predetermined with the radio base station and thus exchanges the required information.

After that, one of a plurality of channels predetermined according to the conditions of radio communication is selected by the radio base station, and in response to an instruction from the radio base station, the radio communication circuit 20 switches to a second channel. Then, the radio communication circuit 20 starts the communication through the second channel, and until an instruction is received from the radio base station, waits for a call from the radio base station.

This state is referred to as the standby state. Thus, the radio communication is conducted intermittently at predetermined time intervals with the radio base station. In the case where the signal is transmitted from the portable telephone apparatus or there is a call from the radio base station and the speech/communication state is entered, however, the radio communication is conducted continuously.

Next, the camera 80 is activated also by the user through the key input unit 60. The CPU 30 displays a function select menu screen on the display unit 40 in accordance with the program stored in the memory unit 50.

The user manipulates the key input unit 60 in accordance with the menu screen and activates the camera 80. The camera 80 may be activated alternatively through an exclusive input switch which may be arranged on the key input unit 60.

Upon receipt of a camera start input from the user through the key input unit 60, the CPU 30 receives the information on the currently-received second receiving channel from the radio communication circuit 20. Based on the second receiving channel information thus received, the CPU 30 reads the dividing ratio setting signal from the frequency control correspondence table (frequency table) stored in the memory unit 50, and by controlling the frequency control circuit 72 with the dividing ratio setting signal thus read, supplies the operating clock signal frequency to the camera in such a manner that the harmonic components are not superposed on the receiving frequency band of the second receiving channel.

As long as the camera 80 remains out of operation, the clock signal supply from the frequency control circuit 72 is stopped under the control of the CPU 30, and therefore no clock signal is supplied.

The CPU 30, after the clock signal begins to be supplied to the camera 80, controls the activation and the operation of the camera 80. In this way, the camera 80 is started and outputs an image under the operating conditions set by the CPU 30. In accordance with the camera function selected by the user and the program stored in the memory unit 50, the CPU 30 executes the process of displaying the image output from the camera 80 on the display unit 40 or storing the image in the memory unit 50.

In the case where an instruction to change the receiving channel is given from the radio base station due to the movement of the portable telephone apparatus while the camera 80 is in operation, the radio communication circuit unit 20 receives the information on a third receiving channel from the radio base station and outputs it to the CPU 30 thereby to change the receiving channel.

The CPU 30, upon receipt of the information on the third receiving channel from the radio communication circuit 20, sets the 1/N variable frequency divider 724 of the frequency control circuit 72 based on the dividing ratio setting signal in the frequency control correspondence table, described later, stored in the memory unit 50. Then, the operating clock signal frequency is supplied to the camera 80 in such a manner that the harmonic components are not superposed on the receiving frequency band of the third receiving channel.

As a result, the third receiving channel thus changed is free of the effect of the radiation noises of the harmonic components. At the time of change in the receiving channel, the first channel may be restored without changing to the third receiving channel. In such a case, the operation is similar to the aforementioned case in which the operating clock signal frequency is supplied to the camera 80 in such a manner that the harmonic component thereof is not superposed on the receiving frequency band of the first receiving channel.

The memory unit 50, as shown in FIG. 5, has stored therein the frequency control correspondence table indicating the settings of the 1/N variable frequency divider 724 in the frequency control circuit 72 for each receiving channel. The CPU 30, upon receipt of the current receiving channel information from the radio communication circuit 20, reads the frequency control correspondence table from the memory unit 50, determines the setting of the 1/N variable frequency divider 724 from the particular information and sets the dividing ratio of the 1/N variable frequency divider 724.

To determine the settings in the frequency control correspondence table, a frequency having a minimum difference with the desired operating frequency for the camera is calculated in advance and stored in the memory unit 50 among those frequencies of which the harmonic component of the operating clock signal does not interfere with the receiving frequency band of the receiving channel.

This is by reason of the fact that the change in the operating clock signal frequency of the camera 80 in accordance with the receiving channel of the radio communication circuit 20 causes a change in the frame rate and the brightness of the image output from the camera 80, and therefore it is important to minimize the image quality change by reducing the amount of change in the frame rate and the brightness.

A minuscule change in the clock signal frequency is accompanied with a minuscule image quality change. This image quality change cannot be perceived by the user. Experiments show that a clock signal frequency change of about 2% or less cannot be recognized by human eyes.

As an example, assume a camera which has an operating clock signal frequency of 32 MHz and an output of 15 fps (frames per second). In the case of the CCD camera used in the portable telephone apparatus, the frame rate increases or decreases substantially in proportion to the operating clock signal frequency.

Assume that the current receiving channel used for communication is the channel D having the central frequency of 863.5 MHz. The frequency band of 862.9 MHz to 864.1 MHz is used, and the frequency 27 times as high as the camera operating clock signal frequency is 864 MHz. Thus, the receiving band of the receiving channel D is interfered and the receiving sensitivity is adversely affected.

In this case, assume that the minimum step of frequency change of the frequency control circuit 72 is set to 0.04 MHz as in the case explained above with reference to FIG. 2. In the case where the setting is changed to 801 to shift to the operating clock signal frequency higher by one step, the operating clock signal frequency is set to 32.04 MHz and the 27-fold frequency is 865.08 MHz. This is not included in the receiving band of the receiving channel D, and therefore the interference of the radiation noises of the harmonic component is reduced.

In the case where the setting is shifted to 799 lower by one step, on the other hand, the operating clock signal frequency is 31.96 MHz and the 27-fold frequency is 862.92 MHz. This frequency is included in the receiving band of the receiving channel, and therefore the interference due to the radiation noises of the harmonic component is retained.

For this reason, the clock frequency of 32.04 MHz to which the operating clock signal is shifted upward by one step has a minimum deviation from the desired clock signal frequency and free of interference with the receiving channel. In the case where the receiving channel D is selected with the setting 801 of the frequency control circuit 72 stored for generating this clock signal frequency, therefore, the operating clock signal frequency of 32.4 MHz is used.

In view of the fact that the harmonic component is not included in the receiving band of the receiving channels A to C and E to F other than the receiving channel D, the setting is determined as 800 and the operating clock signal frequency is set to 32 MHz.

In the case of the CCD camera, the upper limit of the clock signal frequency for drive is often defined by the specification. For the upper limit of 32 MHz, for example, the operating clock signal frequency may be shifted to 31.92 which is lower by two steps with the setting of 798. In this case, the 27-fold frequency is 861.84 MHz, and for lack of the harmonic component in the receiving band of the receiving channel D, the interference is reduced.

Assume that the upper limit in the specification of the camera 80 is 32 MHz and the frequency of 31.92 MHz which is lower by two steps is employed. The proportionality calculation produces the frame rate of 14.9625 fps. This change is as small as about 0.3% which is not more than 2%. Therefore, the user viewing the image can hardly recognize the change.

The first channel, the second channel and the harmonic components are explained with reference to FIG. 6. FIG. 6 is an enlarged view showing the receiving band used in the radio communication according to an embodiment of the invention for explaining the effects of the same embodiment of the invention.

The first channel is one of the receiving channels A to F defined and predetermined by the common carrier for initial use in the communication. This channel for the first communication is the first channel and indicated as the channel C (primary channel) in FIG. 6.

The second channel is switched to by an instruction from the radio base station. Which of the channels A to F is switched to is not known to the portable telephone apparatus in advance. The description is made below on the assumption that the channel D is selected as the second channel.

The receiving band of the channel D is 862.9 MHz to 864.1 MHz. The harmonic of 864 MHz (dotted portion) 27 times as high as the operating clock signal frequency of 32 MHz is included in this frequency band. In the case where the operating clock signal frequency is set to 32.04 MHz according to this embodiment, the 27-fold harmonic component is 865.08 MHz not included in the receiving band of the channel D, and therefore the interference of the radiation noises of the harmonic component of the operating clock signal is reduced.

In the case where the portable telephone apparatus leaves the area covered by the second channel, one of a plurality of predetermined channels is selected in response to an instruction from the radio base station as in the preceding case, and the radio communication circuit 20 is switched to the third receiving channel. In this case, the radio communication circuit 20 may alternatively return to the first channel again.

The aforementioned frequency control method is capable of performing the control operation in a similar way regardless of whether the radio communication circuit 20 is in any one of radio conditions including the standby state, in-speech state and data communication state.

According to this embodiment, the adverse effect which the radiation noises of the harmonic components of the high-speed operating clock signal for operating the camera would otherwise have on the radio communication is eliminated. Therefore, a camera having a high pixel density and high frame rate can be mounted on the portable telephone apparatus. Further, there is no need of a shield case of a metal or a plated material for preventing harmonic noises, and therefore the portable telephone apparatus can be reduced in size, weight and cost.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A portable telephone apparatus with camera comprising:
   a radio communication circuit for conducting radio communication with an external device;
   a clock signal generating circuit capable of controlling an output clock signal frequency of a clock signal;
   a camera adapted to operate with said clock signal as an operating clock signal having an operating clock signal frequency; and
   a control circuit;
   wherein said control circuit, based on receiving frequency band information acquired from said radio communication circuit, controllably-varies said clock signal frequency of said clock signal generating circuit in such a manner that harmonic components of said clock signal frequency are not superposed on a receiving frequency band for said radio communication.

2. A portable telephone apparatus with camera according to claim 1,
   wherein said receiving frequency band information is information on a channel for the radio communication conducted by said radio communication circuit.

3. A portable telephone apparatus with camera according to claim 2, comprising:

a memory unit for storing a table containing settings for determining said operating clock signal frequency, for each channel of radio communication, wherein said control circuit, based on said channel information from said radio communication circuit, determines a setting to specify said operating clock signal frequency according to said table of said memory unit, and controls said clock signal of said clock signal generating circuit according to said setting.

4. A portable telephone apparatus with camera according to claim 1, wherein said clock signal generating circuit includes a reference clock signal generating circuit for generating a reference clock signal, and a frequency control circuit for deriving said operating clock signal from said reference clock signal.

5. A portable telephone apparatus with camera according to claim 2, wherein said clock signal generating circuit includes a reference clock signal generating circuit for generating a reference clock signal, and a frequency control circuit for deriving said operating clock signal from said reference clock signal.

6. A portable telephone apparatus with camera according to claim 3, wherein said clock signal generating circuit includes a reference clock signal generating circuit for generating a reference clock signal, and a frequency control circuit for deriving said operating clock signal from said reference clock signal.

7. A portable telephone apparatus with camera comprising:

a radio communication circuit for conducting radio communication with an external device;

a clock signal generating circuit capable of controlling an output clock signal frequency of a clock signal;

a camera adapted to operate with said clock signal as an operating clock signal having an operating clock signal frequency; and a control circuit;

wherein said control circuit is adapted to receive frequency band information from said radio communication circuit, and when said frequency band information indicates a change in a frequency band for said radio communication, said control circuit controllably-varies said clock signal frequency of said clock signal generating circuit in such a manner that harmonic components of said clock signal frequency are not superposed on the receiving frequency band for said radio communication.

8. A portable telephone apparatus with camera according to claim 7, wherein said receiving frequency band information is information on a channel for the radio communication conducted by said radio communication circuit.

9. A portable telephone apparatus with camera according to claim 8, comprising:

a memory unit for storing a table containing settings for determining said operating clock signal frequency, for each channel of radio communication, wherein said control circuit, based on said channel information from said radio communication circuit, determines a setting to specify said operating clock signal frequency according to said table of said memory unit, and controls said clock signal of said clock signal generating circuit according to said setting.

10. A portable telephone apparatus with camera according to claim 7, wherein said clock signal generating circuit includes a reference clock signal generating circuit for generating a reference clock signal, and a frequency control circuit for deriving said operating clock signal from said reference clock signal.

11. A portable telephone apparatus with camera according to claim 8, wherein said clock signal generating circuit includes a reference clock signal generating circuit for generating a reference clock signal, and a frequency control circuit for deriving said operating clock signal from said reference clock signal.

12. A portable telephone apparatus with camera according to claim 9, wherein said clock signal generating circuit includes a reference clock signal generating circuit for generating a reference clock signal, and a frequency control circuit for deriving said operating clock signal from said reference clock signal.

* * * * *